(12) United States Patent
Qiu et al.

(10) Patent No.: US 12,029,256 B2
(45) Date of Patent: Jul. 9, 2024

(54) POWER SUPPLY DEVICE, ELECTRONIC CIGARETTE, AND ASSEMBLY METHOD

(71) Applicant: CHANGZHOU PATENT ELECTRONIC TECHNOLOGY CO., LTD, Changzhou (CN)

(72) Inventors: Weihua Qiu, Jiangsu (CN); Liangjun Zhou, Jiangsu (CN)

(73) Assignee: CHANGZHOU PATENT ELECTRONIC TECHNOLOGY CO., LTD, Changzhou (CN)

( * ) Notice: Subject to any disclaimer, the term of this patent is extended or adjusted under 35 U.S.C. 154(b) by 518 days.

(21) Appl. No.: 17/357,934

(22) Filed: Jun. 24, 2021

(65) Prior Publication Data

US 2021/0315281 A1    Oct. 14, 2021

Related U.S. Application Data

(63) Continuation-in-part of application No. PCT/CN2019/120255, filed on Nov. 22, 2019.

(30) Foreign Application Priority Data

Dec. 26, 2018  (CN) .......................... 201811599000.2

(51) Int. Cl.
*A24F 40/90* (2020.01)
*A24F 40/10* (2020.01)
(Continued)

(52) U.S. Cl.
CPC .............. *A24F 40/90* (2020.01); *A24F 40/10* (2020.01); *A24F 40/42* (2020.01); *A24F 40/48* (2020.01);
(Continued)

(58) Field of Classification Search
None
See application file for complete search history.

(56) References Cited

U.S. PATENT DOCUMENTS

| 2017/0020190 A1 | 1/2017 | Chang et al. |
| 2018/0199622 A1 | 7/2018 | Balder et al. |

(Continued)

FOREIGN PATENT DOCUMENTS

| CN | 203492792 U | 3/2014 |
| CN | 206260850 U | 6/2017 |

(Continued)

OTHER PUBLICATIONS

The extended European search report of EP application No. 19903196.4 issued on Sep. 9, 2022.

*Primary Examiner* — Oscar C Jimenez
(74) *Attorney, Agent, or Firm* — Andrew C. Cheng (57) ABSTRACT

A power supply device includes a battery housing having a receiving chamber and a battery assembly installed in the receiving chamber. The battery assembly comprises a circuit board and a USB interface connected to the circuit board. The circuit board is protrudingly provided with a retaining protrusion. The retaining protrusion elastically abuts against and is slidable along an inner wall of the receiving chamber along an axial direction of the battery housing. The inner wall of the receiving chamber is provided with a retaining groove corresponding to the retaining protrusion. The retaining groove is provided on the sliding path of the retaining protrusion. The battery housing is further provided with a USB slot. When the retaining protrusion slides to be aligned with the retaining groove, the retaining protrusion is engaged into the retaining groove, and the USB interface is inserted into the USB slot simultaneously.

15 Claims, 9 Drawing Sheets

(51) Int. Cl.
  *A24F 40/42* (2020.01)
  *A24F 40/48* (2020.01)
  *A24F 40/51* (2020.01)
  *H01M 10/42* (2006.01)
  *H01M 10/44* (2006.01)

(52) U.S. Cl.
  CPC ........... *A24F 40/51* (2020.01); *H01M 10/425* (2013.01); *H01M 10/44* (2013.01); *H01M 2220/30* (2013.01)

(56) References Cited

U.S. PATENT DOCUMENTS

| | | | |
|---|---|---|---|
| 2019/0037926 A1* | 2/2019 | Qiu | A24F 40/46 |
| 2019/0261690 A1* | 8/2019 | Lin | H01M 50/213 |
| 2020/0000147 A1* | 1/2020 | Wu | A24F 40/40 |
| 2021/0059305 A1* | 3/2021 | Clough | A24F 40/40 |
| 2021/0315274 A1* | 10/2021 | Qiu | A24F 40/40 |
| 2021/0337879 A1* | 11/2021 | Qiu | A24F 40/95 |

FOREIGN PATENT DOCUMENTS

| | | |
|---|---|---|
| CN | 206354434 U | 7/2017 |
| CN | 206835293 U | 1/2018 |
| CN | 108185532 A | 6/2018 |
| CN | 208064481 U | 11/2018 |
| CN | 208129447 U | 11/2018 |
| CN | 209346110 U | 9/2019 |
| CN | 209420960 U | 9/2019 |
| CN | 209436269 U | 9/2019 |
| WO | 2018068602 A1 | 4/2018 |

* cited by examiner

POWER SUPPLY DEVICE, ELECTRONIC CIGARETTE, AND ASSEMBLY METHOD

CROSS-REFERENCE TO RELATED APPLICATIONS

This application is a continuation-in-part of International patent application No. PCT/CN2019/120255, filed on Nov. 22, 2019, entitled "power supply device, electronic cigarette, and assembly method", which claims priority to Chinese patent application No. 201811599000.2, filed on Dec. 26, 2018. All of the aforementioned patent applications are hereby incorporated by reference in their entireties.

TECHNICAL FIELD

The disclosure relates to the technical field of simulated smoking, and more particularly, relates to a power supply device, an electronic cigarette, and an assembly method.

BACKGROUND

A portable electronic cigarette, commonly known as "small cigarette", includes a cartridge and a power supply device electrically connected to the cartridge, wherein the power supply device includes a battery housing and a battery assembly installed in the battery housing. The battery assembly includes a battery, a circuit board soldered on the battery, and a USB interface soldered on the circuit board. During assembly, due to the shape of the battery and the need to take into account the assembly stability of the USB interface, it is generally necessary to provide a special abutment structure in the battery housing, which is relatively complex, difficult to produce, and inconvenient to assemble.

SUMMARY

Based on the above, it is necessary to provide a power supply device that is convenient for assembling a circuit board.

It is also necessary to provide an electronic cigarette having the power supply device.

It is even more necessary to provide an assembly method with the above-mentioned power supply device or electronic cigarette.

The technical solution adopted by the present disclosure to solve its technical problems is as follows.

A power supply device includes a battery housing having a receiving chamber and a battery assembly installed in the receiving chamber, wherein the battery assembly includes a circuit board and a USB interface connected to the circuit board, the circuit board is protrudingly provided with a retaining protrusion, the retaining protrusion elastically abuts against and is slidable along an inner wall of the receiving chamber along an axial direction of the battery housing, the inner wall of the receiving chamber is provided with a retaining groove corresponding to the retaining protrusion, the retaining groove is provided on the sliding path of the retaining protrusion, the battery housing is further provided with a USB slot; when the retaining protrusion slides to be aligned with the retaining groove, the retaining protrusion is engaged into the retaining groove, and the USB interface is inserted into the USB slot simultaneously.

Further, the receiving chamber is formed by a partial cavity of the battery housing, there are two retaining grooves oppositely provided in the side wall of the battery housing, the USB slot is provided at one end of the battery housing, there are two groove protrusions, and each retaining protrusion is engaged in a corresponding retaining groove.

Further, the battery assembly further includes a battery, the battery is connected to the other end of the circuit board opposite to the USB interface, a symmetry plane between the two retaining protrusions is perpendicular to a symmetry plane between the USB interface and the battery.

Further, the retaining protrusion is an elastic member.

Further, the battery housing includes a first casing and a second casing, the second casing is sleeved on the outside of the first casing, there are two retaining grooves oppositely provided in the side wall of the first casing, there are two retaining protrusions protrudingly provided on opposite ends of the circuit board, each retaining protrusion is engaged in a corresponding retaining groove.

Further, a side wall of the first casing is provided with a limiting groove along an axial direction of the first casing, an inner wall of the second casing is protrudingly provided with a limiting protrusion corresponding to the limiting groove along an axial direction of the second casing, the limiting protrusion is engaged in the limiting groove.

Further, the limiting groove has an upper open end and a lower closed end along the axial direction of the first casing, the retaining groove is provided at the closed end of the limiting groove.

An electronic cigarette includes any one of the above power supply devices.

Further, the electronic cigarette further includes a cartridge, the battery housing is provided with a cavity, a partition plate is provided in the cavity, the partition plate divides the cavity into the receiving chamber and a receiving groove for installing the cartridge, the receiving groove is located above the receiving chamber.

Further, the cartridge is provided with a smoke outlet passage, a sensing passage is provided in the partition plate, the sensing passage is in communication with the smoke outlet passage, the power supply device further includes a sensor installed on the partition plate and in communication with the sensing passage, the battery assembly includes a battery electrically connected to the cartridge, the circuit board is electrically connected to the battery and the sensor.

Further, the upper end surface of the partition plate is protrudingly provided with a mounting post, the sensing passage is provided in the mounting post, the cartridge includes an atomizing chamber and a base, the base is provided with a sensing through hole in communication with the atomizing chamber, the mounting post has a truncated cone structure; when the cartridge and the battery housing are installed in place, the mounting post is at least partially inserted into the base, and the sensing passage is in communication with the sensing through hole.

Further, a locking protrusion is provided on the cartridge, the battery housing is provided with a locking groove corresponding to the locking protrusion, when the cartridge is installed in the receiving groove, the locking protrusion is engaged in the locking groove.

Further, a first electrode pole and a second electrode pole are installed on the partition plate, the first electrode pole is electrically connected to one of the positive electrode and the negative electrode of the battery, the second electrode pole is electrically connected to the other of the positive electrode and the negative electrode of the battery, the cartridge has a first electrode terminal and a second electrode terminal, when the cartridge and the power supply device are in a first connection state, the first electrode pole is in contact with and electrically connected to the first electrode terminal; when the cartridge and the power supply device are in a second connection state, the first electrode pole is in contact with and electrically connected to the second electrode terminal.

An assembly method for a power supply device, adapted for the power supply device described in any one of the foregoing and the electronic cigarette described in any one of the foregoing, including the following steps:

step 1: the battery housing and the battery assembly are respectively clamped, and the end of the battery assembly with the USB interface is adjusted to face the USB slot;

Step 2: the battery assembly is gradually inserted into the receiving chamber along the axial direction of the power supply device, the retaining protrusion abuts against and slides along the inner wall of the receiving chamber, until the retaining protrusion is engaged into the retaining groove and the USB interface is inserted into the USB slot.

Further, the retaining groove is provided in the side wall of the battery housing, the USB slot is provided at one end of the longitudinal direction of the battery housing, the USB slot restricts the battery assembly from moving along the longitudinal direction of the battery housing, and the retaining groove restricts the battery assembly from moving along the radial direction of the battery housing.

Further, when the battery assembly is gradually inserted into the receiving chamber along the axial direction of the power supply device, the retaining protrusion is elastically deformed due to being squeezed by inner walls of the receiving chamber, and abuts against and slides along the inner walls of the receiving chamber; when the battery assembly moves to the position in which the retaining protrusion is in alignment with the retaining groove, the retaining protrusion is resorted and engaged into the retaining groove.

The beneficial effects of the present disclosure are: the power supply device or electronic cigarette provided by the present disclosure, when the battery assembly is slidably installed, the retaining protrusion is engaged in the retaining groove, and at the same time, the USB interface is inserted into the USB slot, to realize the fixing between the circuit board and the battery housing.

The operation is simple, fast, easy for users to assemble, and it is easy to produce.

BRIEF DESCRIPTION OF THE DRAWINGS

Exemplary embodiments of the present disclosure are described more fully hereinafter with reference to the accompanying drawings.

In the drawings, the various components and reference numerals are as follows.

| | | |
|---|---|---|
| cartridge 100 | cartridge body 11 | liquid storage chamber 110 |
| vent tube 111 | liquid injection opening 112 | sealing plug 17 |
| latching groove 113 | locking protrusion 115 | sealing member 12 |
| through hole 121 | groove 122 | atomizing head 13 |
| atomizing tube 131 | atomizing chamber 130 | liquid inlet 1312 |
| liquid guiding member 132 | heating member 133 | base 14 |
| protrusion 141 | latching member 142 | connecting barrel 143 |
| first mounting groove 144 | second mounting groove 145 | first perforation 1431 |
| second perforation 1432 | sensing through hole 146 | air inlet 147 |
| first air passage gap 148 | second air passage gap 149 | first pressing member 15 |
| second pressing member 16 | sleeve 18 | lifting rod 19 |
| power supply device 200 | battery housing 21 | first casing 211 |
| limiting groove 2111 | guiding rib 2112 | receiving chamber 2110 |
| USB slot 2113 | retaining groove 2114 | second casing 212 |
| limiting protrusion 2121 | guiding groove 2122 | receiving groove 2120 |
| first electrode pole 2124 | second electrode pole 2125 | mounting post 2126 |
| sensing passage 2127 | locking groove 2128 | battery assembly 22 |
| circuit board 221 | retaining protrusion 2211 | battery 222 |
| USB interface 223 | sensor 23 | |

DETAILED DESCRIPTION OF PREFERRED EMBODIMENTS

The present disclosure will now be described in detail with reference to the accompanying drawings. These drawings are simplified schematic diagrams, which only illustrate the basic structure of the present disclosure in a schematic way, so it only shows the construction related to the present disclosure.

Figure 1:
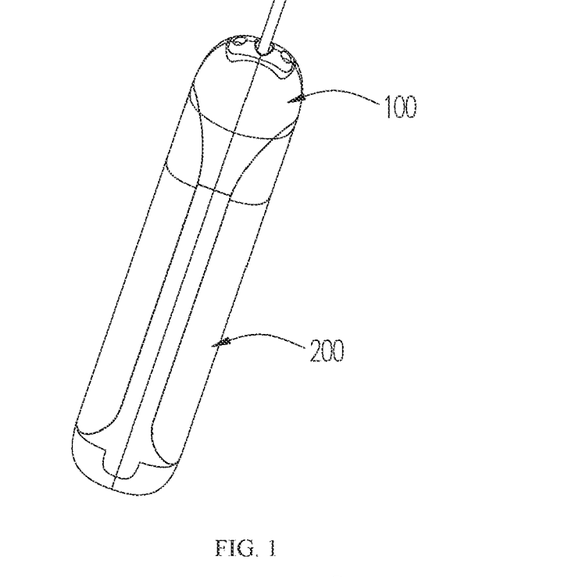
FIG. 1 is a perspective view of the electronic cigarette of the present disclosure.
Figure 2:
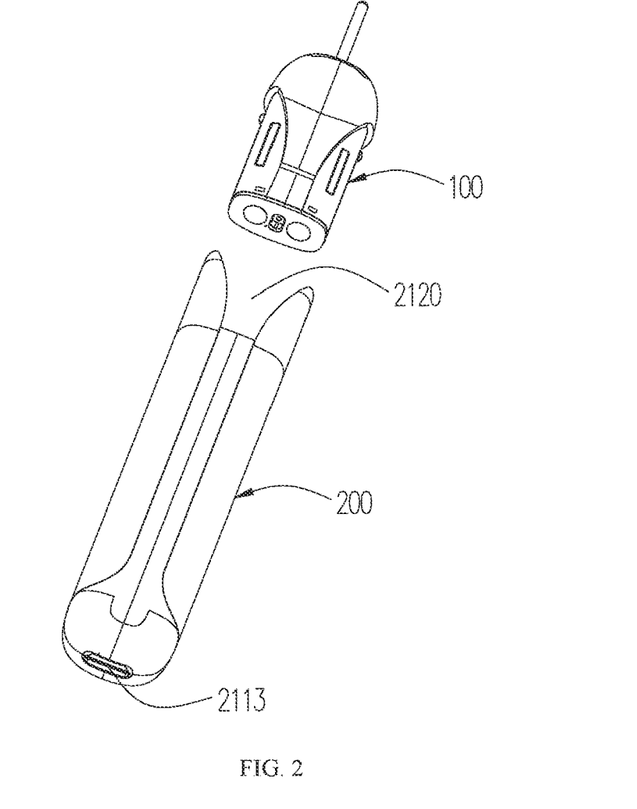
FIG. 2 is an exploded view of the electronic cigarette shown in FIG. 1.

Please refer to FIGS. 1 and 2, the present disclosure provides an electronic cigarette. The electronic cigarette includes a cartridge 100 and a power supply device 200 electrically connected to the cartridge 100. During operation, the power supply device 200 supplies power to the cartridge 100, so that the e-liquid stored in the cartridge 100 is atomized to generate smoke for the user to inhale.

Figure 3:
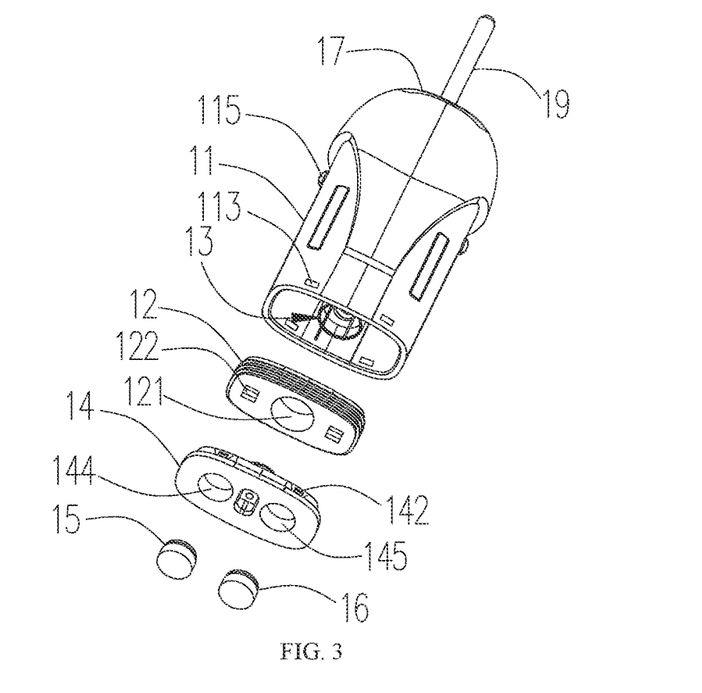
FIG. 3 is a partially exploded view of the cartridge of the electronic cigarette shown in FIG. 2.
Figure 4:
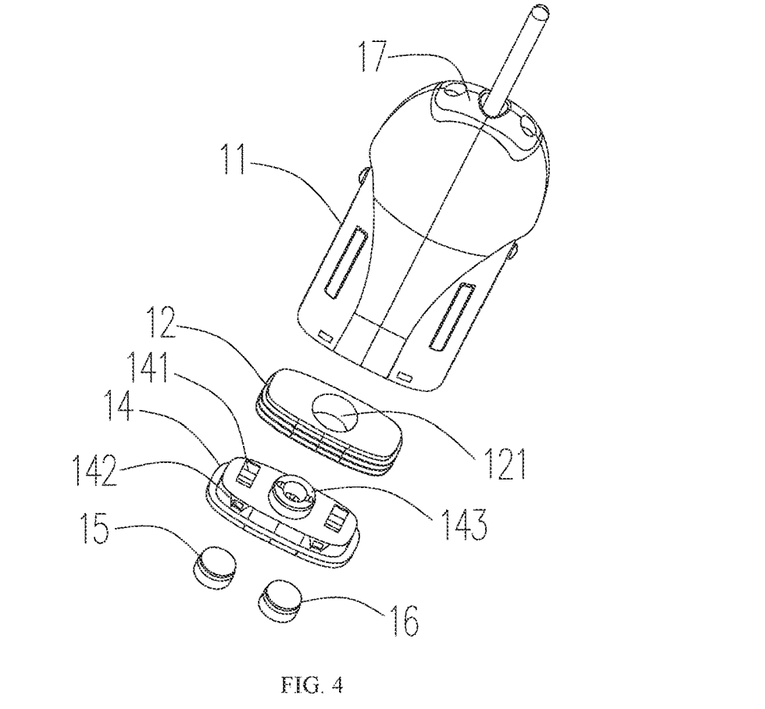
FIG. 4 is a partially exploded view of the cartridge of the electronic cigarette shown in FIG. 2 from another perspective.
Figure 7:
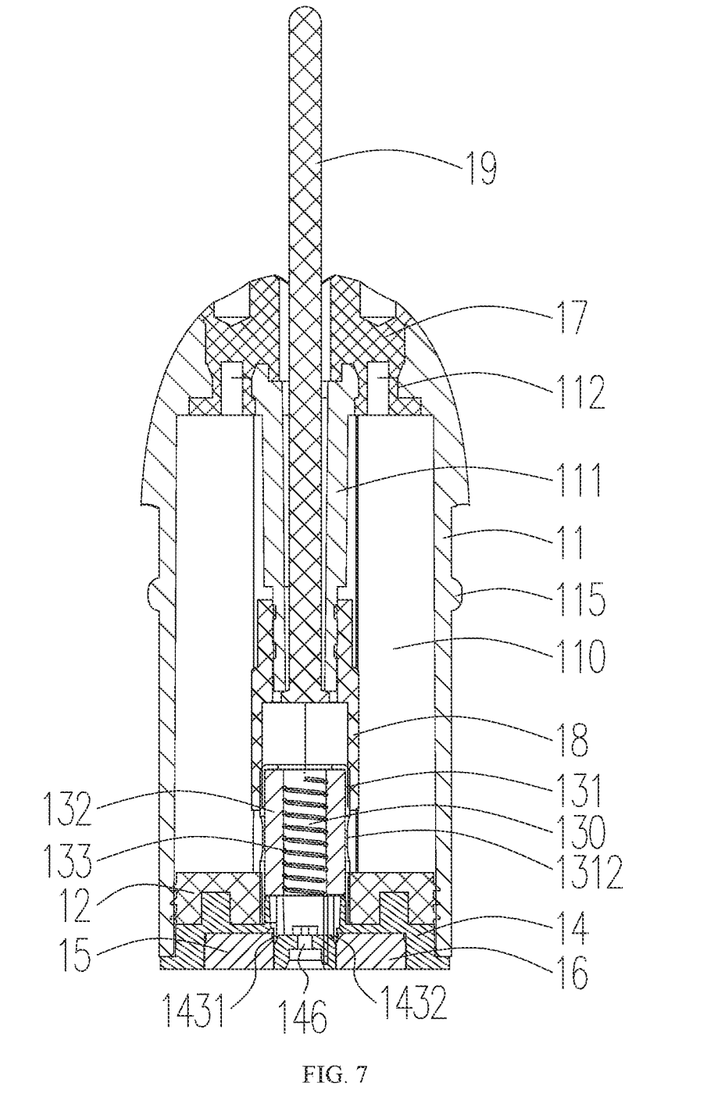
FIG. 7 is a cross-sectional view of the cartridge of the electronic cigarette shown in FIG. 2.

Please refer to FIG. 3, FIG. 4 and FIG. 7, the cartridge 100 includes a cartridge body 11 provided with a liquid storage chamber 110 therein, a sealing member 12 used for sealing the liquid storage chamber 110, an atomizing head 13 mounted on the sealing member 12, a base 14 installed at one end of the cartridge body 11, and a first pressing member 15 and a second pressing member 16 mounted on the base 14.

The cartridge body 11 has generally a hollow cylindrical structure with an opening at the lower end thereof. The cartridge body 11 has a flat structure serving as the contour of the cartridge 100, which can effectively prevent the cartridge 100 from rolling and avoid the cartridge 100 from falling. The liquid storage chamber 110 is formed by the inner cavity of the cartridge body 11, and the e-liquid is stored in the liquid storage chamber 110. The cartridge body 11 is made of a transparent or translucent material, so that the user can observe the amount of the e-liquid in the liquid storage chamber 110 through the cartridge body 11, which is convenient for the user to inject liquid in time. In this embodiment, the cartridge body 11 is made of a transparent material.

A vent tube 111 is formed at the center of the upper end surface of the cartridge body 11 and extends downward along the axial direction of the cartridge body 11. The vent tube 111 is a hollow tube with the upper and lower ends being opened, and the upper end of the vent tube 111 extends through the upper end surface of the cartridge body 11. The upper end surface of the cartridge body 11 is recessed downward to form a liquid injection opening 112 in communication with the liquid storage chamber 110, and the user can inject liquid into the liquid storage chamber 110 through the liquid injection opening 112. In addition, a sealing plug 17 is installed in the liquid injection opening 112 to prevent the e-liquid from leaking through the liquid injection opening 112. It can be understood that the material of the sealing plug 17 includes but is not limited to silicone or rubber.

The sealing member 12 has a substantially cylindrical structure, and the sealing member 12 is received in the lower end of the cartridge body 11. Specifically, the liquid storage chamber 110 is formed by a space enclosed by the inner wall of the cartridge body 11 and the upper end surface of the sealing member 12. A through hole 121 is provided at the center of the sealing member 12 along the axial direction of the sealing member 12. The through hole 121 extends through the upper and lower end surfaces of the sealing member 12. The atomizing head 13 is connected to the through hole 121. The material of the sealing member 12 includes but is not limited to silicone or rubber, so as to improve the sealing performance of the liquid storage chamber 110 and prevent the leakage of the e-liquid. In addition, the lower end surface of the sealing member 12 is provided with two grooves 122, and the two grooves 122 are symmetrically arranged on both sides of the through hole 121.

The atomizing head 13 includes an atomizing tube 131 provided with an atomizing chamber 130 therein and a heating structure (not labeled) received in the atomizing chamber 130. The heating structure has two pins, when the two pins are respectively connected to the positive and negative poles of the power supply device 200, the heating structure can generate heat to atomize the e-liquid when the atomizing circuit is triggered to be conducted.

The atomizing tube 131 has substantially a hollow cylindrical structure with both ends being opened. The atomizing chamber 130 is formed by the inner cavity of the atomizing tube 131. The lower end of the atomizing tube 131 is inserted into the through hole 121, the upper end of the atomizing tube 131 is received in the liquid storage chamber 110, and the atomizing chamber 130 is in communication with the inner cavity of the vent tube 111. A liquid inlet 1312 is provided in the side wall of the atomizing tube 131. The liquid inlet 1312 communicates the liquid storage chamber 110 with the atomizing chamber 130. In order to prevent a large amount of the e-liquid in the liquid storage chamber 110 from flooding into the atomizing chamber 130, causing the atomizing head 13 to be drowned, a liquid guiding member 132 is provided in the atomizing chamber 130 corresponding to the liquid inlet 1312 to prevent the e-liquid in the liquid storage chamber 110 from excessively entering the atomizing chamber 130. In this embodiment, the heating structure includes a liquid guiding member 132 and a heating member 133 that are in contact with each other. The liquid guiding member 132 is capable of absorbing the e-liquid. The heating member 133 generates heat after being energized. The liquid guiding member 132 is attached to the inner wall of the atomizing tube 131 corresponding to the liquid inlet 1312 so as to absorb the e-liquid entering the atomizing chamber 130 through the liquid inlet 1312, and the heating member 133 is accommodated in the liquid guiding member 132. In this embodiment, the liquid guiding member 132 is cotton, and the heating member 133 is a heating wire. It can be understood that, in other embodiments not shown, the liquid guiding member 132 can also be sponge, fiber rope, porous ceramic, or porous graphite, etc. The heating member 133 can also be a heating plate, a heating net, or a heating rod.

It can be understood that, in other embodiments not shown, the heating structure may also be a ceramic heating body. That is, the ceramic heating body has the ability to absorb the e-liquid, and also has the ability to heat the e-liquid. It is also understood that the heating structure may also be an ultrasonic heating device or a heating tube, etc., which is not limited here.

In this embodiment, the cartridge 100 further includes a sleeve 18 and a lifting rod 19. The sleeve 18 has a hollow cylindrical structure with an opening at the lower end thereof. The sleeve 18 is slidably sleeved on the outside of the atomizing tube 131 along the axial direction of the atomizing head 13. The lifting rod 19 has a rod-shaped structure and slidably extends through the inside of the vent tube 111. The lower end of the lifting rod 19 is connected to the upper end of the sleeve 18. The upper end of the lifting rod 19 extends to the outside of the cartridge body 11. When the cartridge 100 leaves the factory, the sleeve 18 is sleeved on the outside of the atomizing tube 131 corresponding to the liquid inlet 1312 to close the liquid inlet 1312 to prevent the e-liquid in the liquid storage chamber 110 from entering the atomizing head 13 through the liquid inlet 1312, so that the e-liquid is isolated from the outside air to prevent the e-liquid from contacting with the air to be deteriorated due to the change in temperature and air pressure during transportation, and it can further prevent the atomizing head 13 from leaking due to excessive e-liquid entering thereinto. In use, the lifting rod 19 is pulled upwards by the user, the sleeve 18 is driven by the lifting rod 19 to move upward together to open the liquid inlet 1312, so that the liquid storage chamber 110 is in communication with the atomizing chamber 130 through the liquid inlet 1312. When the pulling rod 19 continues to be pulled upward until the upper end surface of the sleeve 18 resists against the lower end surface of the vent tube 111, the lifting rod 19 can be separated from the sleeve 18 and can be drawn out from the vent tube 111. At this time, the atomizing chamber 130 is in communication with the inner cavity of the vent tube 111 through the sleeve 18. It can be understood that, the sleeve 18 is made of silicone or rubber material, in order to facilitate the sealing of the liquid inlet 1312 when the cartridge 100 leaves the factory, and to facilitate the deformation of the sleeve 18 to separate it from the lifting rod 19. In this embodiment, the sleeve 18 and the pulling rod 19 are integrally formed, and the junction of the sleeve 18 and the pulling rod 19 is pulled apart so that the sleeve 18 is separated from the pulling rod 19.

The base 14 is covered on the lower end of the cartridge body 11 and is located outside the liquid storage chamber 110. The upper end surface of the base 14 is provided with protrusions 141 corresponding to the grooves 122. When the sealing member 12 and the base 14 are installed in place, the protrusions 141 and the grooves 122 are engaged with each other correspondingly, so that the base 14 and the sealing member 12 are relatively fixed. In addition, a latching member 142 is protrudingly provided on the outer wall of the base 14. A latching groove 113 is provided in the side wall of the cartridge body 11 corresponding to the latching member 142. The latching member 142 and the latching groove 113 are engaged with each other, so as to achieve a fixed connection relationship between the base 14 and the cartridge body 11. It can be understood that, in other embodiments not shown, the base 14 and the cartridge body 11 may also be detachably connected by plugging, threaded connection, or magnetic connection. In other embodiments not shown, the positions of the latching member 142 and the latching groove 113 can be interchanged.

Figure 5:
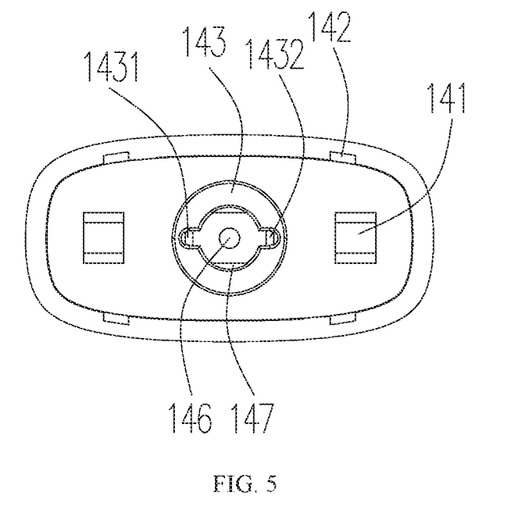
FIG. 5 is a top view of the base of the cartridge shown in FIG. 4.
Figure 6:
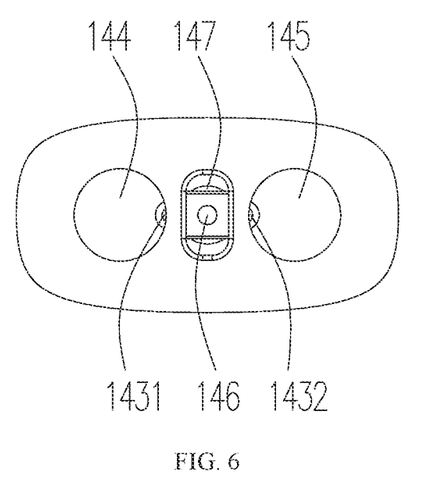
FIG. 6 is a bottom view of the base of the cartridge shown in FIG. 4.

Please refer to FIG. 5 and FIG. 6 at the same time, a hollow connecting barrel 143 extends upward along the axial direction of the base 14 from the center of the upper end surface of the base 14. The connecting barrel 143 is inserted into the lower end of the atomizing tube 131 and communicates with the atomizing chamber 130. A first mounting groove 144 and a second mounting groove 145 are formed by recessing upward from the lower end surface of the base 14. The first pressing member 15 is installed in the first mounting groove 144, and the second pressing member 16 is installed in the second mounting groove 145. The connecting barrel 143 is also provided with a first perforation 1431 and a second perforation 1432. One end of the first perforation 1431 extends through the upper end surface of the connecting barrel 143, and the other end of the first through hole 1431 is in communication with the first mounting groove 144. One end of the second perforation 1432 extends through the upper end surface of the connecting barrel 143, and the other end of the second through hole 1432 is in communication with the second mounting groove 145. In this embodiment, one pin of the heating member 133 passes through the first perforation 1431 and then extends into the first mounting groove 144, and is pressed by the first pressing member 15 and fixed on the groove wall of the first mounting groove 144; the other pin of the heating member 133 passes through the second perforation 1432 and then extends into the second mounting groove 145, and is pressed by the second pressing member 16 and fixed on the groove wall of the second mounting groove 145. The first pressing member 15 and the second pressing member 16 are both electrical conductors; thus, the function of electrically connecting the two pins of the heating member 133 with the first pressing member 15 and the second pressing member 16 is realized, and at the same time, it also realizes the fixing function of the heating member 133. It can be understood that, both the first pressing member 15 and the second pressing member 16 are made of conductive materials such as stainless steel or copper. In order to achieve electrical isolation and avoid short circuits, the base 14 is made of an insulating material. In this embodiment, the base 14 is made of plastic. The first pressing member 15 constitutes a first electrode terminal of the cartridge 100, and the second pressing member 16 constitutes a second electrode terminal of the cartridge 100.

When the user needs to disassemble or replace the heating member 133, it only needs to remove the first pressing member 15 and the second pressing member 16 to release the pressing action to the heating member 133, so that the heating member 133 can be easily removed. The operation is simple and convenient, and the user experience is improved.

In addition, the lower end surface of the base 14 is provided with a sensing through hole 146 and an air inlet 147 along the axial direction of the base 14. The sensing through hole 146 and the air inlet 147 are both in communication with the atomizing chamber 130 through the inner cavity of the connecting barrel 143. In this embodiment, there is one sensing through hole 146 located at the center of the base 14, and there are two air inlets 147 symmetrically arranged on both sides of the sensing through hole 146. The symmetrical arrangement of the air inlets 147 ensures that the external air can evenly enter the atomizing chamber 130. In addition, referring to FIG. 7, the first mounting groove 144 and the second mounting groove 145 are symmetrically arranged on both sides of the sensing through hole 146. When the cartridge 100 is installed onto the power supply device 200, there is no need to consider the positive and negative polarities, so that the effect that the cartridge 100 can be inserted from front side or back side is realized.

Figure 8:
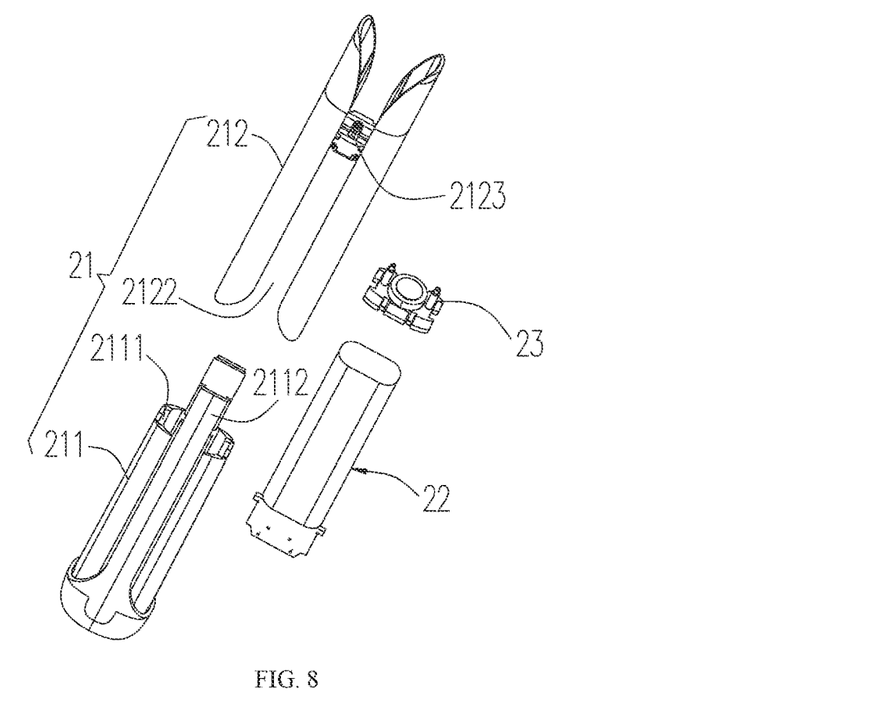
FIG. 8 is a partially exploded view of the power supply device of the electronic cigarette shown in FIG. 2.

Referring to FIG. 8, the power supply device 200 includes a battery housing 21, and a battery assembly 22 and a sensor 23 mounted on the battery housing 21.

The battery housing 21 includes a first casing 211 and a second casing 212 sleeved outside the first casing 211. Please refer to FIG. 9 and FIG. 10, the first casing 211 has generally a hollow cylindrical structure with an opening at the upper end. A limiting groove 2111 is provided on the side wall of the first casing 211 along the axial direction of the first casing 21. The limiting groove 2111 penetrates through the inner and outer walls and the upper end surface of the first casing 211. A guiding rib 2112 is protrudingly provided on the outer wall of the first casing 211 along the axial direction of the first casing 211. Please refer to FIG. 12 and FIG. 13, the second casing 212 has substantially a hollow cylindrical structure with upper and lower ends being opened. The inner wall of the second casing 212 is provided with a limiting protrusion 2121 corresponding to the limiting groove 2111 along the axial direction of the second casing 212. The side wall of the second casing 212 is provided with a guiding groove 2122 corresponding to the guiding rib 2112 along the axial direction of the second casing 212. The guiding groove 2122 penetrates through the inner and outer walls and the lower end surface of the second casing 212.

Figure 9:
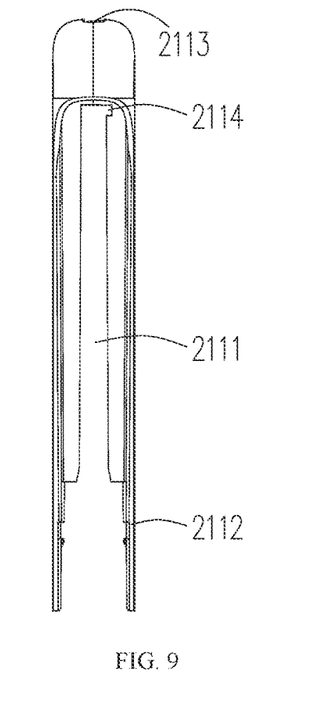
FIG. 9 is a front view of the first casing of the power supply device shown in FIG. 8.
Figure 10:
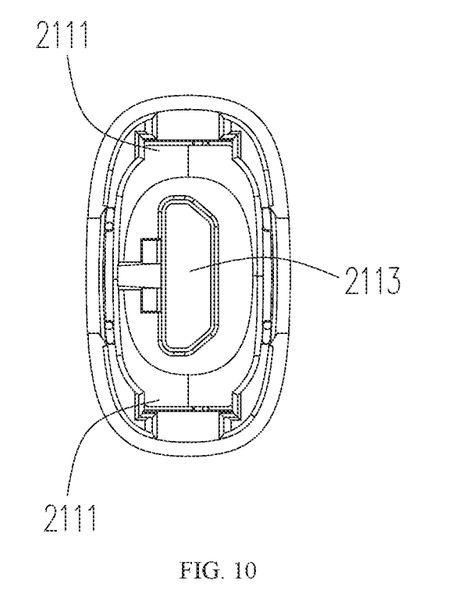
FIG. 10 is a bottom view of the first casing of the power supply device shown in FIG. 9.
Figure 12:
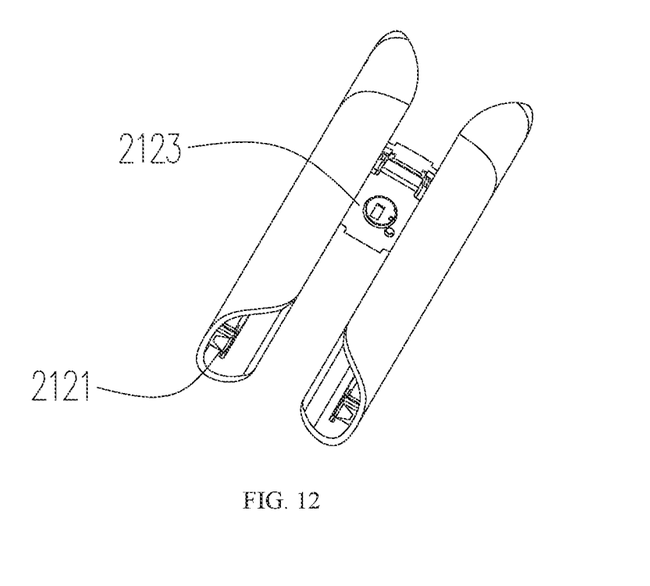
FIG. 12 is a schematic structural diagram of the second casing of the power supply device shown in FIG. 8 from another perspective.
Figure 13:
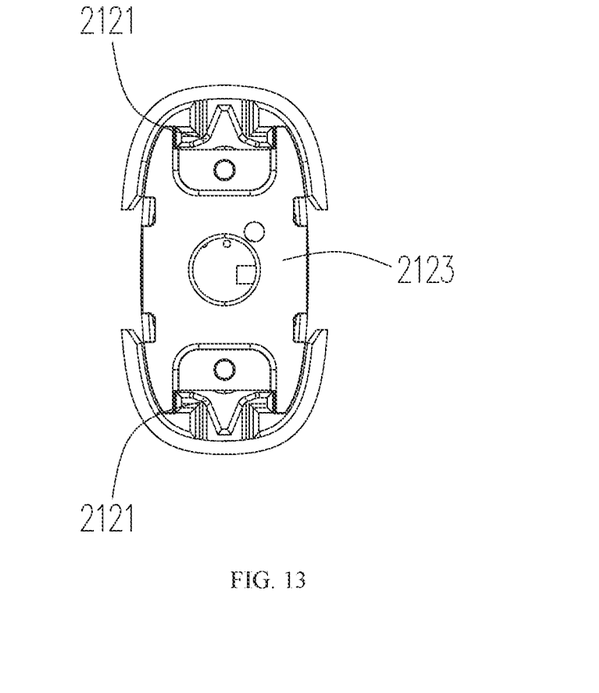
FIG. 13 is a bottom view of the second casing shown in FIG. 12.

When the first casing 211 and the second casing 212 are separated from each other, due to the action of the limiting groove 2111 on the first casing 211, the parts of the first casing 211 located on both sides of the limiting groove 2111 have a certain degree of elastic deformation ability, which allows the parts of the first casing 211 on both sides of the limiting groove 2111 to be deformed to a certain extent. Similarly, due to the action of the guiding groove 2122 on the second casing 212, the parts of the second casing 212 located on both sides of the guiding groove 2122 have a certain elastic deformation ability, which allows the parts of the second casing 212 on both sides of the guiding groove 2122 to be deformed to a certain extent. The two casings are engaged with each other through the limiting groove 2111 and the limiting protrusion 2121, so that the deformation of the first casing 211 and the second casing 212 can be controlled, and further deformation during transportation is prevented. In this embodiment, the first casing 211 and the second casing 212 are both plastic parts, the mold is easy to form, and the production efficiency is high.

When the first casing 211 and the second casing 212 are connected, the second casing 212 is sleeved on the outside of the first casing 211, so that the limiting protrusion 2121 is engaged in the limiting groove 2111, and the guiding rib 2112 is engaged in the guiding groove 2122. At this time, the limiting protrusion 2121 occupies the space of the limiting groove 2111, and the guiding rib 2112 occupies the space of the guiding groove 2122. Thus, the first casing 211 and the second casing 212 are fixedly connected, and the space of the limiting groove 2111 of the first casing 211 is occupied by the limiting protrusion 2121, thereby restricting the deformation of the first casing 211 along the front and rear sides of the limiting groove 2111 (i.e., the surface where the guiding rib 2112 is located). The space of the guiding groove 2122 of the second casing 212 is occupied by the guiding rib 2112, thereby restricting the deformation of the second casing 212 along the left and right sides of the guiding groove 2122 (i.e., the surface where the guiding rib 2112 is located). In addition, the outer surface of the second casing 212 and the outer surface of the guiding rib 2112 are on the same surface, so that the battery housing 21 has a consistent outer contour, and the aesthetics of the battery housing 21 is improved.

The present disclosure also provides an assembly method of the battery housing, which includes the following steps:

Step 1: the first casing 211 and the second casing 212 are respectively clamped, so that the limiting protrusion 2121 is aligned with the limiting groove 2111, and at the same time, the guiding rib 2112 is aligned with the guiding groove 2122.

Step 2: the second casing 212 is sleeved on the outside of the first casing 211, so that the limiting protrusion 2121 is engaged in the limiting groove 2111, and at the same time, the guiding rib 2112 is engaged in the guiding groove 2122.

Further, the limiting protrusion 2121 extends along the longitudinal axis of the second casing 212. A partition plate 2123 is provided at one end of the limiting protrusion 2121, the partition plate 2123 is arranged along the radial direction of the second casing 212. After the second casing 212 is sleeved on the outside of the first casing 211, the partition plate 2123 restricts the axial movement of the first casing 211 relative to the second casing 212, the limiting protrusion 2121 restricts the radial movement of the first casing 211 relative to the second casing 212.

In this embodiment, the cross-sectional shape of the limiting groove 2111 is generally trapezoidal. Correspondingly, the cross-sectional shape of the limiting protrusion 2121 is also trapezoidal, thereby further preventing relative movement between the first casing 211 and the second casing 212 in the radial direction of the electronic cigarette, so that the connection stability between the first casing 211 and the second casing 212 is improved.

In this embodiment, there are two limiting grooves 2111 symmetrically arranged on the side wall of the first casing 212. There are two guiding ribs 2112 symmetrically arranged on the side wall of the first casing 212. The symmetry plane between the two limiting grooves 2111 is perpendicular to the symmetry plane between the two guiding ribs 2112. Correspondingly, there are two limiting protrusions 2121 and two guiding grooves 2122. It can be understood that, in other embodiments not shown, the number of the limiting groove 2111 and the guiding rib 2112 can also be three, four or more, which is not limited here.

Figure 15:
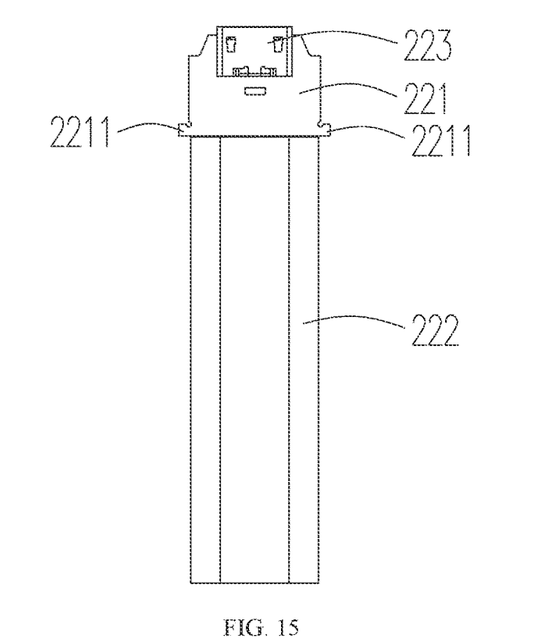
FIG. 15 is a schematic structural diagram of the battery assembly of the power supply device shown in FIG. 8.

Referring to FIG. 15, the battery assembly 22 includes a circuit board 221, a battery 222 connected to one end of the circuit board 221, and a USB interface 223 connected to the other end of the circuit board 221 opposite to the battery 222. The user can charge the battery 222 through the USB interface 223.

Please refer to FIG. 8, FIG. 11, FIG. 14, and FIG. 16, a cavity (not labeled) is formed and enclosed by the first casing 211 and the second casing 212. A partition plate 2123 is provided inside the second casing 212 along the radial direction of the second casing 212. The partition plate 2123 divides the cavity into a receiving chamber 2110 for installing the battery assembly 22 and a receiving groove 2120 (see FIG. 2) for installing the cartridge 100. The receiving groove 2120 is located above the receiving chamber 2110. Specifically, the partition plate 2123 is located away from the closed end of the first casing 211, so that the receiving chamber 2110 forms a closed structure, and the upper end of the receiving groove 2120 forms an opening. In this embodiment, the partition plate 2123 and the second casing 212 are integrally formed. It can be understood that, in other embodiments not shown, the partition plate 2123 and the second casing 212 may also be separate parts, in use, the two are only needed to be fixedly connected, for example, by hot-melt connection or welding.

Figure 11:
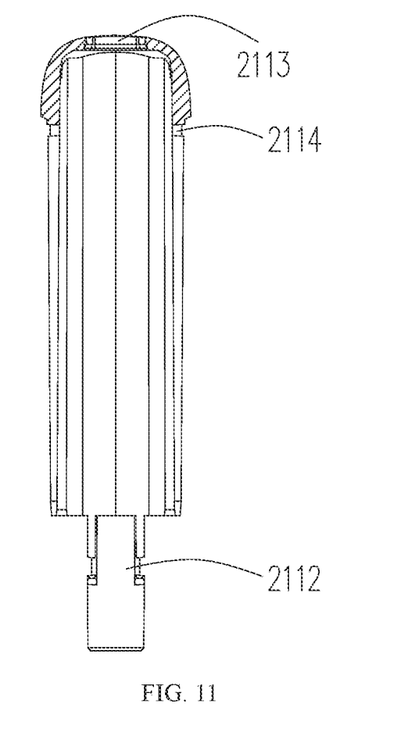
FIG. 11 is a cross-sectional view of the first casing of the power supply device shown in FIG. 8.

One end of the first casing 211 away from the cartridge 100 is provided with a USB slot 2113 that matches with the USB interface 223. Two retaining grooves 2114 in communication with the receiving chamber 2110 are oppositely provided in the side wall of the first casing 211. In this embodiment, the retaining groove 2114 penetrates through the inner and outer walls of the first casing 211. Two retaining protrusions 2211 are protrudingly provided on opposite ends of the circuit board 221, each retaining protrusion 2211 is engaged in a corresponding retaining groove 2114. The symmetry plane between the two retaining protrusions 2211 is perpendicular to the symmetry plane between the USB interface 223 and the battery 222. The retaining protrusion 2211 is made of an elastic material, so that the retaining protrusion 2211 can be deformed when exerted by an external force. When the external force exerted on the retaining protrusion 2211 is removed, the retaining protrusion 2211 can be restored. In this embodiment, the retaining protrusion 2211 is made of plastic. It can be understood that, in other embodiments not shown, the retaining protrusion 2211 may also be an elastic member such as a stainless steel spring sheet. There are at least two retaining protrusions 2211.

Figure 16:
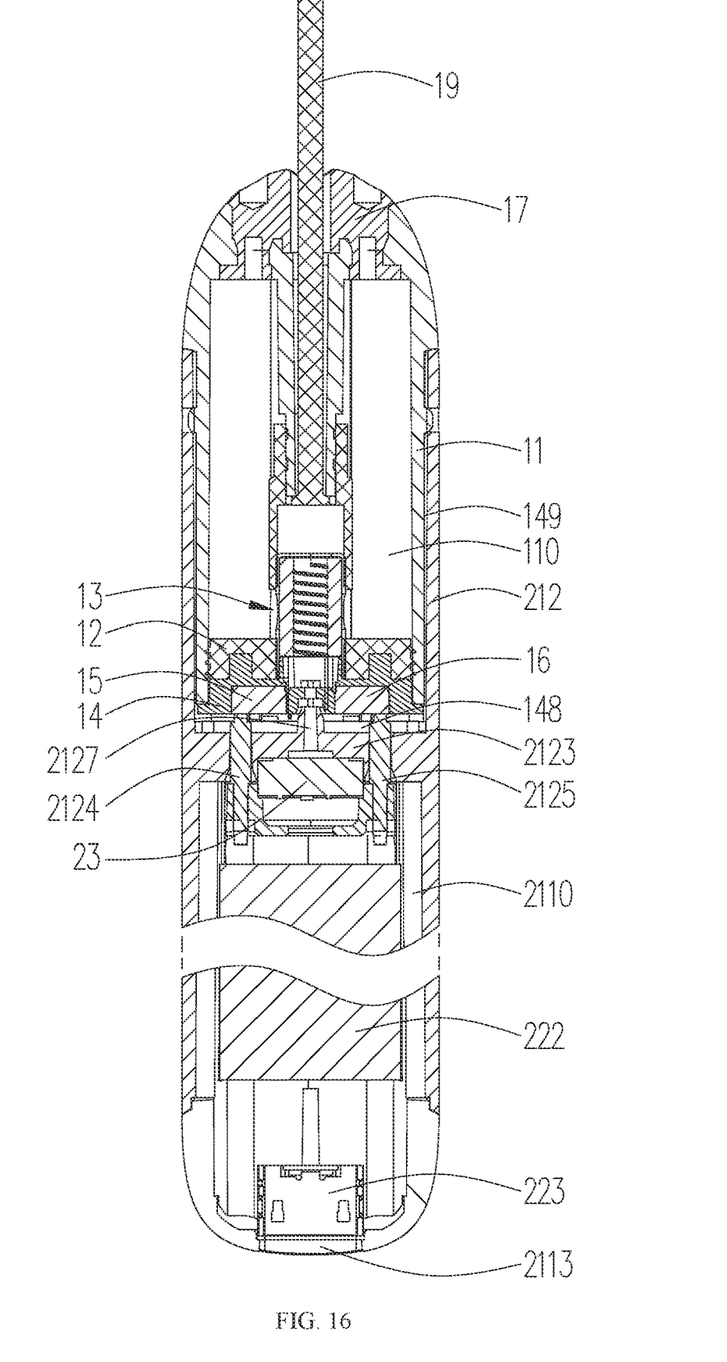
FIG. 16 is a cross-sectional view of the electronic cigarette shown in FIG. 1.

When installing the battery assembly 22, the end of the battery assembly 22 with the USB interface 223 is firstly adjusted to face the USB slot 2113; then the battery assembly 22 is gradually inserted into the receiving chamber 2110 along the axial direction of the power supply device 200, the retaining protrusions 2211 are elastically deformed due to being squeezed by the opposite inner walls of the receiving chamber 2110, and abut against and slide along the inner walls of the receiving chamber 2110. The retaining groove 2114 is provided on the sliding path of the retaining protrusion 2211. When the battery assembly 22 moves to the position in which the retaining protrusion 2211 is in alignment with the retaining groove 2114, the retaining protrusion 2211 is resorted and engaged into the retaining groove 2114; at the same time, the USB interface 223 is inserted into the USB slot 2113 along the sliding direction of the retaining protrusion 2211. In this way, the retaining protrusion 2211 and the retaining groove 2114 are engaged with each other to restrict the movement of the circuit board 221 along the axial direction of the power supply device 200. In addition, the USB interface 223 is inserted into the USB slot 2113 to restrict the movement of the circuit board 221 along the radial direction of the power supply device 200, thereby realizing the fixing of the circuit board 221 in the battery housing 21. The operation is simple and fast, convenient for users to assemble, and it is easy to produce. It can be understood that, in other embodiments not shown, the retaining groove 2114 may not penetrate through the outer wall of the first casing 211, and it only needs to satisfy that the retaining groove 2114 is recessed from the inner wall of the receiving chamber 2110.

The present disclosure also provides an assembly method of the power supply device, which includes the following steps:

Step 1: the battery housing 21 and the battery assembly 22 are respectively clamped, and the end of the battery assembly 22 with the USB interface 223 is adjusted to face the USB slot 2113;

Step 2: the battery assembly 22 is gradually inserted into the receiving chamber 2110 along the axial direction of the power supply device 200, the retaining protrusion 2211 abuts against and slides along the inner wall of the receiving chamber 2110, until the retaining protrusion 2211 is engaged into the retaining groove 2114, and the USB interface 223 is inserted into the USB slot 2113.

Further, the retaining groove 2114 is provided in the side wall of the battery housing 21, the USB slot 2113 is provided at one end of the longitudinal direction of the battery housing 21, the USB slot 2113 restricts the battery assembly 22 from moving along the longitudinal direction of the battery housing 21, and the retaining groove 2114 restricts the battery assembly 22 from moving along the radial direction of the battery housing 21.

Figure 14:
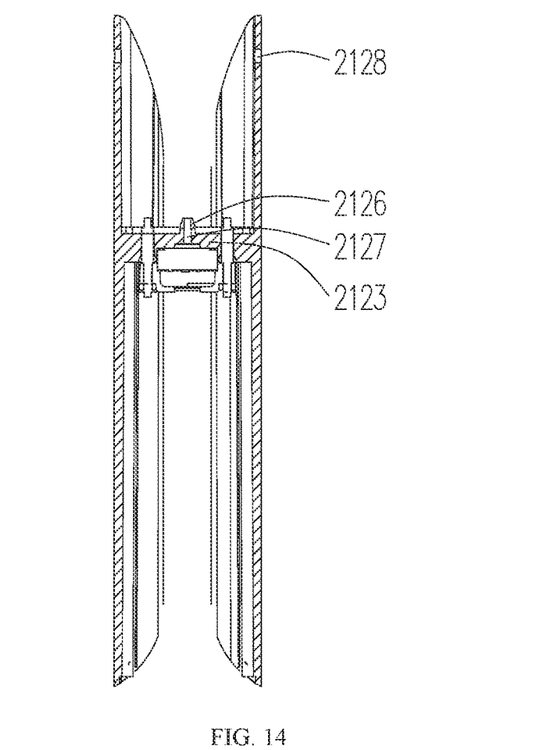
FIG. 14 is a cross-sectional view of the second casing shown in FIG. 8.

A first electrode pole 2124 and a second electrode pole 2125 are respectively penetrated through the partition plate 2123, the lower end of the first electrode pole 2124 and the lower end of the second electrode pole 2125 both extend into the receiving chamber 2110. The lower end of the first electrode pole 2124 is electrically connected to one of the positive electrode and the negative electrode of the battery 222, and the lower end of the second electrode pole 2125 is electrically connected to the other of the positive electrode and the negative electrode of the battery 222. The upper end of the first electrode pole 2124 and the upper end of the second electrode pole 2125 both extend into the receiving groove 2120. When the cartridge 100 is installed in the receiving groove 2120, the first electrode pole 2124 is in contact with and electrically connected to the first pressing member 15, and the second electrode pole 2125 is in contact with and electrically connected to the second pressing member 16. Thus, the electrical connection between the heating structure and the battery 222 is realized.

A mounting post 2126 is protrudingly provided on the upper end surface of the partition plate 2123, the mounting post 2126 is provided with a sensing passage 2127 along the axial direction of the mounting post 2126. The upper end of the sensing passage 2127 extends through the upper end surface of the mounting post 2126, the lower end of the sensing passage 2127 extends through the lower end surface of the partition plate 2123. The partition plate 2123 is further provided with a first electrode hole (not labeled) and a second electrode hole (not labeled) that are symmetrically arranged about the sensing passage 2127, wherein the first electrode pole 2124 is installed in the first electrode hole, and the second electrode pole 2125 is installed in the second electrode hole. The first electrode terminal is arranged corresponding to one of the first electrode pole 2124 and the second electrode pole 2125, the second electrode terminal is arranged corresponding to the other of the first electrode pole 2124 and the second electrode pole 2125. When the cartridge 100 and the power supply device 200 are in a first connection state, the first electrode pole 2124 is in contact with and electrically connected to the first electrode terminal; when the cartridge 100 and the power supply device 200 are in a second connection state, the first electrode pole 2124 is in contact with and electrically connected to the second electrode terminal. In this embodiment, the transition from the first connection state to the second connection state is obtained by rotating the power supply device 200 relative to the cartridge 100 by 180°, thereby achieving the purpose of electrical conduction for both front insertion and back insertion.

The circuit board 221 is electrically connected to the battery 222 and the sensor 23. In this embodiment, the sensor 23 is installed at the lower end of the partition plate 2123 to close the sensing passage 2127. The sensing end of the sensor 23 is connected to the sensing passage 2127. When the cartridge 100 and the battery housing 21 are installed in place, the mounting post 2126 is at least partially inserted into the base 14, and the sensing passage 2127 is in communication with the sensing through hole 146. In this embodiment, the mounting post 2126 has a truncated cone structure. When the excessive e-liquid or water droplets formed after the condensation of the smoke in the atomizing chamber 130 flows down through the sensing through hole 146 to contact the mounting post 2126, the e-liquid or water droplets can flow along the slope of the mounting post 2126 to the circumference of the mounting post 2126, so as to prevent the liquid from entering the sensing passage 2127 causing damage to the sensor 23 or blocking the sensing passage 2127.

In this embodiment, the sensor 23 is a pressure sensor. When the user sucks, a negative pressure is generated in the sensing passage 2127 due to the suction effect, the sensor 23 senses the air pressure change in the sensing passage 2127 and transmits the air pressure change signal to the circuit board 221. After receiving the signal, the circuit board 221 controls the battery 222 to supply power to the heating structure, thereby heating the e-liquid, so that the e-liquid generates smoke under the heating action, thereby realizing automatic control. It can be understood that, in other embodiments not shown, the sensor 23 may also be an airflow sensor that communicates with the external atmosphere and the sensing passage 2127; at this time, when the user sucks, the circuit board 221 controls the battery 222 to supply power to the heating structure after receiving the airflow change signal from the airflow sensor.

In order to improve the stability of the connection between the cartridge 100 and the power supply device 200, the outer wall of the cartridge body 11 is provided with locking protrusions 115 disposed oppositely, the side wall of the second casing 212 is provided with locking grooves 2128 corresponding to the locking protrusions 115. When the cartridge body 11 and the second casing 212 are installed in place, the locking protrusions 115 and the locking grooves 2128 are engaged with each other. In addition, a first air passage gap 148 in communication with the air inlet 147 is formed between the lower end surface of the base 14 and the upper end surface of the partition plate 2123, a second air passage gap 149 is formed between the outer wall of the cartridge body 11 and the inner wall of the second casing 212, the second air passage gap 149 is in communication with the outside atmosphere and the first air passage gap 148. When the user sucks, the external air enters the atomizing chamber 130 through the second air passage gap 149, the first air passage gap 148, the air inlet 147 and the inner cavity of the connecting barrel 143 in sequence, and is mixed with the smoke, the mixed smoke enters the user's mouth through the inner cavity of the vent tube 111, wherein the second air passage gap 149, the first air passage gap 148, the air inlet 147 and the inner cavity of the connecting barrel 143 together constitute an air inlet passage (not labeled), and the inner cavity of the vent tube 111 constitutes a smoke outlet passage (not labeled).

In the electronic cigarette of the present disclosure, the two pins of the heating structure are respectively pressed and fixed by the first pressing member 15 and the second pressing member 16, which is convenient for users to replace the heating structure. The operation is simple and convenient, and the connection stability is strong, thereby improving the user experience. In addition, the battery housing 21 includes a first casing 211 and a second casing 212 mutually engaged with each other, the limiting groove 2111 on the first casing 211 enables the first casing 211 to have a certain elastic deformation ability, the guiding groove 2122 on the second casing 212 enables the second casing 212 to have a certain elastic deformation ability, which can prevent deformation during transportation, reduce resource waste, and save production cost. In addition, when the battery assembly 22 is slidably installed, the retaining protrusion 2211 is engaged with the retaining groove 2114, and at the same time, the USB interface 223 is inserted into the USB slot 2113, to realize the fixing between the circuit board 221 and the battery housing 21. The operation is simple, fast, easy for users to assemble, and it is easy to produce.

The above embodiments merely represent several implementations of the present application, and the descriptions thereof are more specific and detailed, but they shall not be understood as a limitation on the scope of the present application. It should be noted that, for those of ordinary skill in the art, variations and improvements may still be made without departing from the concept of the present application, and all of which shall fall into the protection scope of the present application. Therefore, the scope of protection of the present application shall be subject to the appended claims.

What is claimed is:

1. A power supply device comprising a battery housing having a receiving chamber and a battery assembly installed in the receiving chamber, wherein the battery assembly comprises a circuit board and a USB interface connected to the circuit board, the circuit board is protrudingly provided with a retaining protrusion, the retaining protrusion is slidable along an inner wall of the receiving chamber along an axial direction of the battery housing, the inner wall of the receiving chamber is provided with a retaining groove corresponding to the retaining protrusion, the retaining groove is provided on the sliding path of the retaining protrusion, the battery housing has a lower end and an opposite upper end, the battery housing is further provided with a USB slot at the lower end of the battery housing; wherein the battery assembly is installed into the receiving chamber by inserting the battery assembly into the receiving chamber from the upper end of the battery housing, the retaining protrusion elastically abuts against the inner wall of the receiving chamber while sliding from the upper end towards the lower end of the battery housing until the retaining protrusion slides to be aligned with and engaged into the retaining groove, and the USB interface is inserted into the USB slot simultaneously.

2. The power supply device according to claim 1, wherein the receiving chamber is formed by a partial cavity of the battery housing, there are two retaining grooves oppositely provided in the side wall of the battery housing, the USB slot is provided at one end of the battery housing, there are two groove protrusions, and each retaining protrusion is engaged in a corresponding retaining groove.

3. The power supply device according to claim 2, wherein the battery assembly further comprises a battery, the battery is connected to the other end of the circuit board opposite to the USB interface, a symmetry plane between the two retaining protrusions is perpendicular to a symmetry plane between the USB interface and the battery.

4. The power supply device according to claim 1, wherein the retaining protrusion is an elastic member.

5. The power supply device according to claim 1, wherein the battery housing comprises a first casing and a second casing, the second casing is sleeved on the outside of the first casing, there are two retaining grooves oppositely provided in a side wall of the first casing, there are two retaining protrusions protrudingly provided on opposite ends of the circuit board, each retaining protrusion is engaged in a corresponding retaining groove.

6. The power supply device according to claim 5, wherein the side wall of the first casing is provided with a limiting groove along an axial direction of the first casing, an inner wall of the second casing is protrudingly provided with a limiting protrusion corresponding to the limiting groove along an axial direction of the second casing, the limiting protrusion is engaged in the limiting groove.

7. The power supply device according to claim 6, wherein the limiting groove has an upper open end and a lower closed end along the axial direction of the first casing, the retaining groove is provided at the closed end of the limiting groove.

8. An assembly method for the power supply device according to claim 1, the assembly method comprising the following steps:
step 1: the battery housing and the battery assembly are respectively clamped, and the end of the battery assembly with the USB interface is adjusted to face the USB slot;
step 2: the battery assembly is gradually inserted into the receiving chamber from the upper end of the battery housing along the axial direction of the power supply device, the retaining protrusion abuts against the inner wall of the receiving chamber while sliding from the upper end towards the lower end of the battery housing, until the retaining protrusion is engaged into the retaining groove and the USB interface is inserted into the USB slot.

9. The assembly method for a power supply device according to claim 8, wherein the retaining groove is provided in the side wall of the battery housing, the USB slot is provided at one end of the longitudinal direction of the battery housing, the USB slot restricts the battery assembly from moving along the longitudinal direction of the battery housing, and the retaining groove restricts the battery assembly from moving along the radial direction of the battery housing.

10. The assembly method for a power supply device according to claim 8, wherein when the battery assembly is gradually inserted into the receiving chamber along the axial direction of the power supply device, the retaining protrusion is elastically deformed due to being squeezed by the inner wall of the receiving chamber, and abuts against and slides along the inner wall of the receiving chamber; when the battery assembly moves to the position in which the retaining protrusion is in alignment with the retaining groove, the retaining protrusion is resorted and engaged into the retaining groove.

11. An electronic cigarette comprising a power supply device, the power supply device comprising a battery housing having a receiving chamber and a battery assembly installed in the receiving chamber, wherein the battery assembly comprises a circuit board and a USB interface connected to the circuit board, the circuit board is protrudingly provided with a retaining protrusion, the retaining protrusion is slidable along an inner wall of the receiving chamber along an axial direction of the battery housing, the inner wall of the receiving chamber is provided with a retaining groove corresponding to the retaining protrusion, the retaining groove is provided on the sliding path of the retaining protrusion, the battery housing is further provided with a USB slot; when the retaining protrusion slides to be aligned with the retaining groove, the retaining protrusion is engaged into the retaining groove, and the USB interface is inserted into the USB slot simultaneously;

wherein the electronic cigarette further comprises a cartridge, the battery housing is provided with a cavity, a partition plate is provided in the cavity, the partition plate divides the cavity into the receiving chamber and a receiving groove for installing the cartridge, the receiving groove is located above the receiving chamber.

12. The electronic cigarette according to claim 11, wherein the cartridge is provided with a smoke outlet passage, a sensing passage is provided in the partition plate, the sensing passage is in communication with the smoke outlet passage, the power supply device further comprises a sensor installed on the partition plate and in communication with the sensing passage, the battery assembly comprises a battery electrically connected to the cartridge, the circuit board is electrically connected to the battery and the sensor.

13. The electronic cigarette according to claim 12, wherein the upper end surface of the partition plate is protrudingly provided with a mounting post, the sensing passage is provided in the mounting post, the cartridge comprises an atomizing chamber and a base, the base is provided with a sensing through hole in communication with the atomizing chamber, the mounting post has a truncated cone structure; when the cartridge and the battery housing are installed in place, the mounting post is at least partially inserted into the base, and the sensing passage is in communication with the sensing through hole.

14. The electronic cigarette according to claim 11, wherein a locking protrusion is provided on the cartridge, the battery housing is provided with a locking groove corresponding to the locking protrusion, when the cartridge is installed in the receiving groove, the locking protrusion is engaged in the locking groove.

15. The electronic cigarette according to claim 11, wherein a first electrode pole and a second electrode pole are installed on the partition plate, the first electrode pole is electrically connected to one of the positive electrode and the negative electrode of the battery, the second electrode pole is electrically connected to the other of the positive electrode and the negative electrode of the battery, the cartridge has a first electrode terminal and a second electrode terminal, when the cartridge and the power supply device are in a first connection state, the first electrode pole is in contact with and electrically connected to the first electrode terminal; when the cartridge and the power supply device are in a second connection state, the first electrode pole is in contact with and electrically connected to the second electrode terminal.

* * * * *